United States Patent [19]

Claassen et al.

[11] Patent Number: 5,506,609

[45] Date of Patent: Apr. 9, 1996

[54] MINIMIZING COLOR BLEED WHILE MAXIMIZING THROUGHPUT FOR COLOR PRINTING

[75] Inventors: Stuart L. Claassen, Santa Clara; Joseph Ku, Foster City; Anitta L. Bliss, San Jose, all of Calif.

[73] Assignee: Apple Computer, Inc., Cupertino, Calif.

[21] Appl. No.: 85,967

[22] Filed: Jun. 30, 1993

[51] Int. Cl.⁶ .................................. B41J 2/07; B41J 2/21
[52] U.S. Cl. ................................ 347/41; 347/43; 347/37
[58] Field of Search ............................... 347/41, 43, 37, 347/12, 15; 358/505, 502, 529, 538, 532, 518

[56] References Cited

U.S. PATENT DOCUMENTS

| | | |
|---|---|---|
| 4,198,642 | 4/1980 | Gamblin . |
| 4,748,453 | 5/1988 | Lin et al. ................................ 347/43 |
| 4,751,528 | 6/1988 | Spehrley, Jr. et al. . |
| 4,943,813 | 7/1990 | Palmer et al. ............................ 347/41 |
| 4,971,408 | 11/1990 | Hoisington et al. . |
| 4,992,806 | 2/1991 | Peer . |
| 5,353,387 | 10/1994 | Petschik et al. ......................... 347/43 |

FOREIGN PATENT DOCUMENTS 0455389  11/1991  European Pat. Off. .................. 347/43

Primary Examiner—Benjamin R. Fuller
Assistant Examiner—David Yockey
Attorney, Agent, or Firm—Blakely, Sololoff, Taylor & Zafman

[57] ABSTRACT

A method is described for optimizing printing a first print dot, a second print dot, a third print dot, and a fourth print dot adjacent to each other on a sheet of paper. The method first determines whether the first, second, third, and fourth print dots to be printed are in black color. If any one of the first, second, third, and fourth print dots is in the black color, then the respective one of first, second, third, and fourth print dots needs to be double printed with the black color. If the first and second print dots are in the black color and the third and fourth print dots are color print dots, then the first and second print dots are printed with the black color and the third color print dot is printed during a first print pass by the printer. The first and second print dots are then double printed with the black color and the fourth color print dot is printed during a second print pass by the printer such that the first and second print dots are double printed with the black color and the third and fourth print dots are alternately printed by the first and second print passes. Color bleeding is minimized between the third and fourth color print dots while the first and second print dots can be double printed with the black color by only the first and second print passes to increase print density with a resulting increase in the throughput of the printing.

9 Claims, 10 Drawing Sheets

Figure 1B (Prior Art)

| 11 | 12 | 13 | 14 | 15 | 16 |
|---|---|---|---|---|---|
| COLOR1 11a | 12a | COLOR2 13a | 14a | 15a BLACK (I & II) | 16a |
| 11b | COLOR1 12b | 13b | COLOR2 14b | 15b | 16b BLACK (I & II) |
| COLOR1 11c | 12c | COLOR2 13c | 14c | 15c BLACK (I & II) | 16c |
| 11d | COLOR1 12d | 13d | COLOR2 14d | 15d | 16d BLACK (I & II) |

RESULT AFTER SECOND PASS

Figure 1C (Prior Art)

| COLOR1 11a | COLOR1 12a | COLOR2 13a | COLOR2 14a | 15a BLACK (I & II) | 16a BLACK (I) |
|---|---|---|---|---|---|
| COLOR1 11b | COLOR1 12b | COLOR2 13b | COLOR2 14b | 15b BLACK (I) | 16b BLACK (I & II) |
| COLOR1 11c | COLOR1 12c | COLOR2 13c | COLOR2 14c | 15c BLACK (I & II) | 16c BLACK (I) |
| COLOR1 11d | COLOR1 12d | COLOR2 13d | COLOR2 14d | 15d BLACK (I) | 16d BLACK (I & II) |

RESULT AFTER THIRD PASS

Figure 1D (Prior Art)

| 11 | 12 | 13 | 14 | 15 | 16 |
|---|---|---|---|---|---|
| COLOR1 11a | COLOR1 12a | COLOR2 13a | COLOR2 14a | 15a BLACK (I & II) | 16a BLACK (I & II) |
| COLOR1 11b | COLOR1 12b | COLOR2 13b | COLOR2 14b | 15b BLACK (I & II) | 16b BLACK (I & II) |
| COLOR1 11c | COLOR1 12c | COLOR2 13c | COLOR2 14c | 15c BLACK (I & II) | 16c BLACK (I & II) |
| COLOR1 11d | COLOR1 12d | COLOR2 13d | COLOR2 14d | 15d BLACK (I & II) | 16d BLACK (I & II) |

RESULT AFTER FOURTH PASS

Figure 5A

| 151 | 152 | 153 | 154 | 155 | 156 |
|---|---|---|---|---|---|
| COLOR1 151a | 152a | COLOR2 153a | 154a | 155a BLACK (I) | 156a BLACK (I) |
| 151b | COLOR1 152b | 153b | COLOR2 154b | 155b BLACK (I) | 156b BLACK (I) |
| COLOR1 151c | 152c | COLOR2 153c | 154c | 155c BLACK (I) | 156c BLACK (I) |
| 151d | COLOR1 152d | 153d | COLOR2 154d | 155d BLACK (I) | 156d BLACK (I) |

RESULT AFTER FIRST PASS

| 151 | 152 | 153 | 154 | 155 | 156 |
|---|---|---|---|---|---|
| COLOR1 151a | COLOR1 152a | COLOR2 153a | COLOR2 154a | 155a BLACK (I & II) | 156a BLACK (I & II) |
| COLOR1 151b | COLOR1 152b | COLOR2 153b | COLOR2 154b | 155b BLACK (I & II) | 156b BLACK (I & II) |
| COLOR1 151c | COLOR1 152c | COLOR2 153c | COLOR2 154c | 155c BLACK (I & II) | 156c BLACK (I & II) |
| COLOR1 151d | COLOR1 152d | COLOR2 153d | COLOR2 154d | 155d BLACK (I & II) | 156d BLACK (I & II) |

RESULT AFTER SECOND PASS 5,506,609

MINIMIZING COLOR BLEED WHILE MAXIMIZING THROUGHPUT FOR COLOR PRINTING

FIELD OF THE INVENTION

The present invention pertains to the field of color printing on plain paper. More particularly, this invention relates to a method of minimizing color bleed while maximizing throughput for color printing, wherein the black color of the color printing is double printed to improve black optical density.

BACKGROUND OF THE INVENTION

Color ink jet printers use either inks prepared with water or other vaporizable solvents or in the alternative, inks which are solid at room temperature and liquid at elevated temperatures. Inks which contain solvents such as water or other vaporizable solvents require that the ink be dried by vaporization of the solvent after the ink has been applied, by the printer, to a substrate such as a sheet of paper and absorbed by the substrate. Inks which are liquid at elevated temperatures will be dried by reducing the elevated temperatures.

A prior problem associated with the color ink jet printing is color bleeding. Color bleeding is the mixing together of dissimilar liquid color inks when printed adjacent to each other on the substrate before the dissimilar color inks are dried and absorbed by the substrate. Typically, a color ink-jet printed graphics or picture is made by printing color print dots adjacent to each other. The adjacent color print dots are in contact with each other. When the adjacent color print dots are in different colors, the color inks of the adjacent color print dots will mix with each other before the color inks are dried or absorbed. This typically causes the boundaries of adjacent color print dots of dissimilar colors to become blurred and not to have sharp clean edges. This is referred to as the color bleeding.

As stated above, color bleeding typically occurs before the dissimilar color inks of the adjacent color print dots are dried and/or absorbed. Typically, the substrate that receives the color inks is a sheet of plain paper or a sheet of specially coated paper. Plain papers are typically composed of a wide variety of copy and bond papers that are used primarily for xerography and typewriting. These plain papers are typically manufactured using a wide variety of wood pulp. This typically causes the plain papers to have widely different pH values, opacities, and surface properties. This typically causes the plain papers to have widely different ink absorption speeds. Therefore, it is typically impossible and impractical to control color bleeding by controlling use of the plain papers.

One prior approach to lessening the color bleeding problem is a checkerboard pattern printing approach. This approach allows the adjacent color print dots to be alternately printed, thus minimizing the color bleeding problem.

By employing the prior checkerboard pattern printing, only every alternate color of print dots are printed during one print pass of the print head. During a subsequent print pass of the print head, the remaining color print dots are filled in. The spacing between the color print dots during each print pass prevents the inks of the color print dots from mixing together and, therefore, reduces the tendency of color bleeding.

One prior disadvantage associated with the checkerboard pattern printing approach is that the throughput of the printer will be substantially reduced if the color printing is accompanied with black text printing which requires optical density (i.e., double printing the black text). When this occurs, four separate print passes of the print head are required to accomplish the combined color and optical density black text printing. FIGS. 1A through 1D illustrate the respective result after each of the four print passes.

Referring to FIGS. 1A–1D, a print pattern 10 is shown that includes six print columns 11–16. Each of print columns 11–16 includes four print dots. For example, print column 11 includes print dots 11a through 11d and print column 16 includes print dots 16a through 16d. Columns 11–14 comprise color print dots and columns 15–16 comprise black text print dots. FIG. 1A illustrates the print result after the first print pass. FIG. 1B illustrates the print result after the second print pass. FIG. 1C illustrates the print results after the third print pass and FIG. 1D illustrates the print result after the fourth print pass.

As can be seen from FIG. 1A, each of print columns 11–16 has alternate print dots printed. For example, column 12 has color print dots 12b and 12d printed and column 15 has black print dots 15a and 15c printed. This is due to the checkerboard filtering function.

Because the black text dots of print pattern 10 need to be double printed, the second print pass will basically deal with double printing the black print dots printed during the first print pass. As can be seen from FIG. 1B, print dots 15a, 15c, 16b, and 16d are double printed with the black color.

Next, the remaining print dots of print pattern 10 are printed, as can be seen from FIG. 1C. At this time, however, the remaining black print dots are not double printed. For example, dots 15b and 15d are not double printed and dots 16a and 16c are not double printed. Those black print dots are then double printed in the fourth print pass, as shown in FIG. 1D.

Therefore, by employing the prior checkerboard pattern printing method, the combined color and optical density black text printing can only be realized in four print passes that greatly reduces the throughput of the printer.

SUMMARY AND OBJECTS OF THE INVENTION

One of the objects of the present invention is to provide a method of optimizing printing quality of a combined color and black text printing.

Another object of the present invention is to provide a method of maximizing the throughput of a combined color and back text printing.

Another object of the present invention is to provide a method of optimizing printing quality of a combined color and black text printing while maximizing the throughput of the printing.

A further object of the present invention is to provide a method of combining checkerboard color printing and double black text printing in only two print passes such that color bleeding of the color printing is minimized while the throughput of the printing is increased.

A method is described for optimizing printing a first print dot, a second print dot, a third print dot, and a fourth print dot adjacent to each other on a sheet of paper. The method first determines whether the first, second, third, and fourth print dots to be printed are in black color. If any one of the first, second, third, and fourth print dots is in the black color, then the respective one of first, second, third, and fourth print dots needs to be double printed with the black color. If the first and second print dots are in the black color and the third and fourth print dots are color print dots, then the first and second print dots are printed with the black color and the third color print dot is printed during a first print pass by the printer. The first and second print dots are then double printed with the black color and the fourth color print dot is printed during a second print pass by the printer such that the first and second print dots are double printed with the black color and the third and fourth print dots are alternately printed in the first and second print passes. Color bleeding is minimized between the third and fourth color print dots while the first and second print dots is double printed with the black color by only the first and second print passes to increase print density with a resulting increase in the throughput of the printing.

A method for optimizing ink jet printing a plurality of print dots adjacent to each other on a sheet of paper by a printer is also described. The plurality of print dots include a number of color print dots and a number of black text dots. The method comprises the steps of:

(A) separating the number of black text dots from the number of color print dots, wherein the number of black text dots of the plurality of print dots need to be double printed;

(B) sending the number of color print dots to a checkerboard filter to obtain a first alternate number of color print dots and a second alternate number of color print dots from the number of color print dots, wherein the first and second alternate numbers of color print dots constitute the number of color print dots, wherein each of the first alternate number of color print dots is adjacent to one of the second number of color print dots;

(C) bypassing the number of black text dots through the checkerboard filter such that the number of black text dots can all be printed in each of a first print pass and a second print pass of the printer;

(D) printing the first alternate number of color print dots and the number of black text dots in the first print pass of the printer (E) printing the second alternate number of color print dots and double printing the number of black text dots in the second print pass of the printer such that the number of color print dots are alternately printed while the number of black text dots are double printed during the first and second print passes so as to minimize color bleeding between the number of color print dots while the black color can be double printed during only the first and second passes such that print density of the numer of black text dots is increased with a resulting increase in the throughput of the ink jet printing.

Other objects, features, and advantages of the present invention will be apparent from the accompanying drawings and from the detailed description that follows below.

BRIEF DESCRIPTION OF THE DRAWINGS

The present invention is illustrated by way of example and not limited by the figures of the accompanying drawings, in which like references indicate similar elements and in which:

FIGS. 1A through 1D illustrate a prior art color printing method that reduces color bleeding while the black color is double printed;

FIGS. 5A and 5B illustrate a color print format printed in accordance with one embodiment of the present invention;

DETAILED DESCRIPTION

Figure 1A:
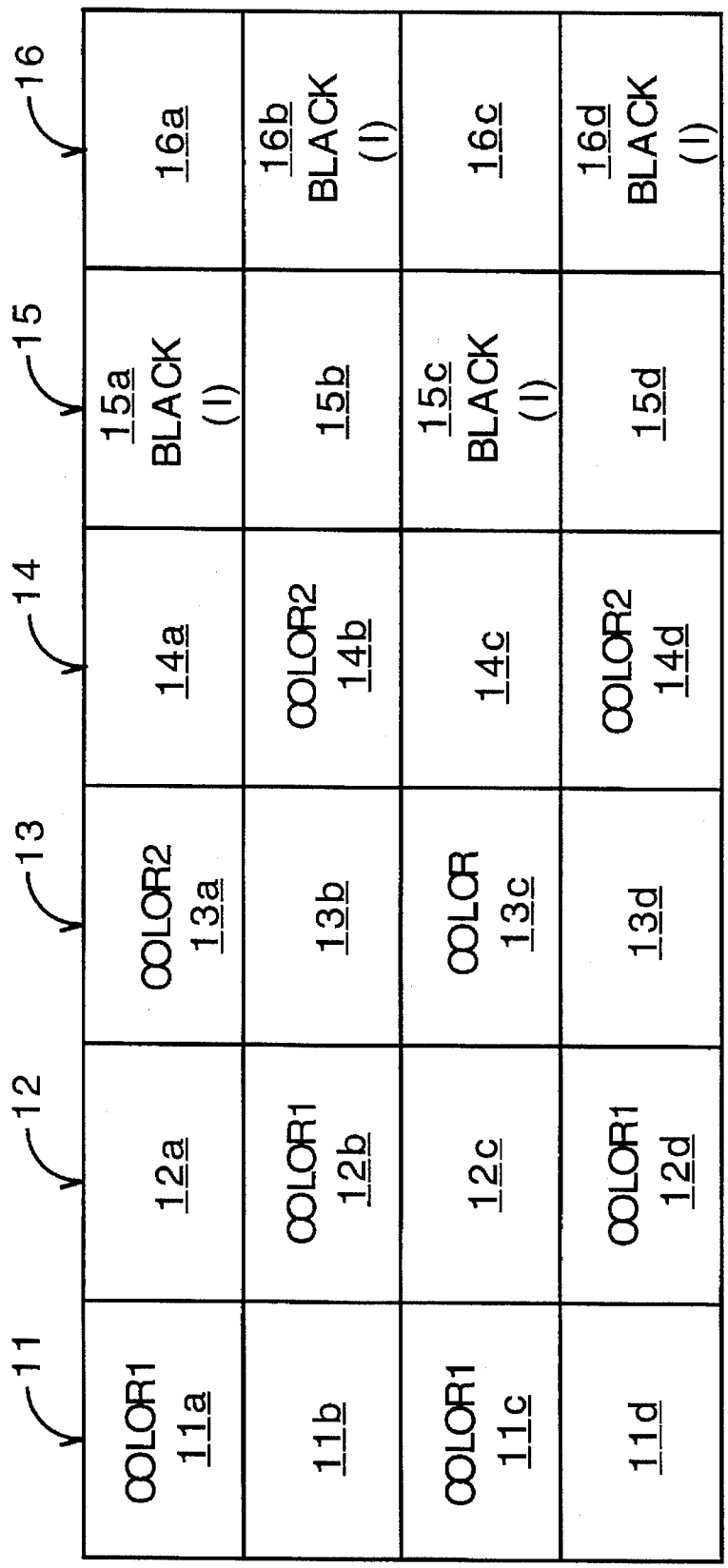
Figure 2:
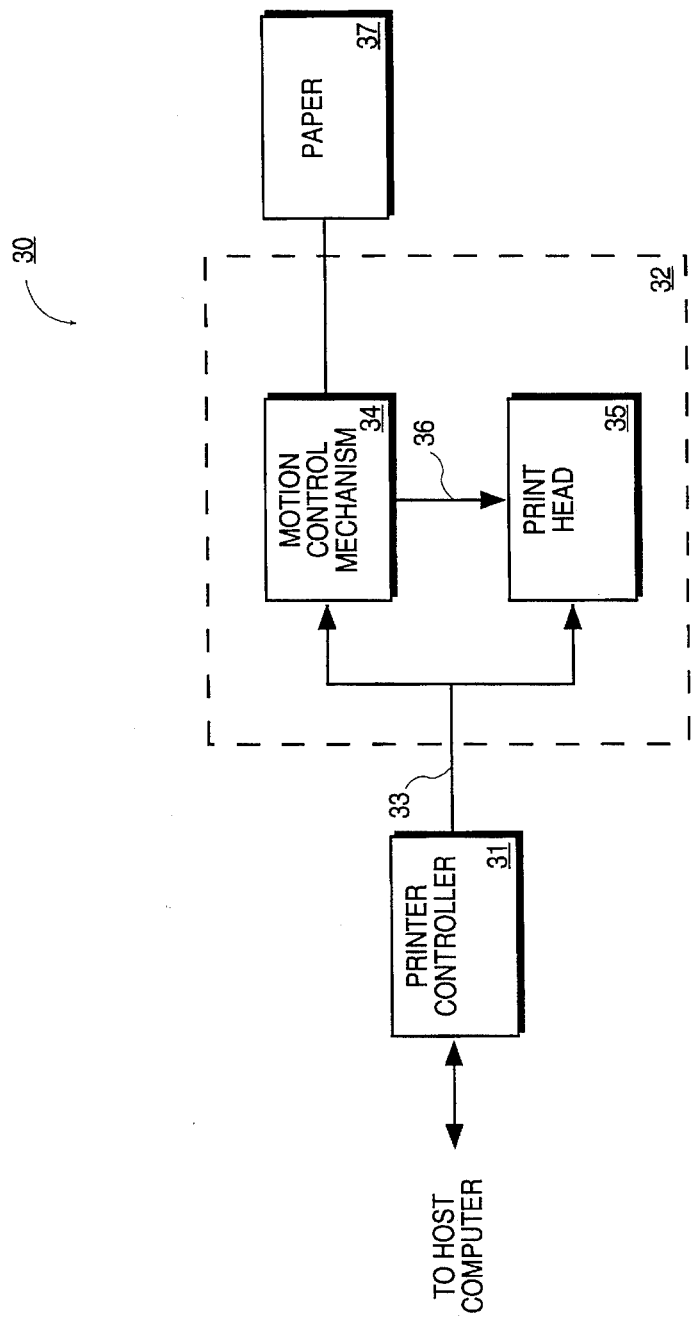
FIG. 2 is a block diagram of a color ink jet printer that implements one embodiment of the present invention.

FIG. 2 illustrates in schematic form a color ink jet printer 30 which implements an embodiment of the present invention. In one embodiment, printer 30 is a scan printer system.

As shown in FIG. 2, printer 30 includes a printer controller 31 and a printer engine 32. Printer controller 31 is connected to an external host computer (not shown) and receives the data to be printed from the external host computer. Printer controller 31 then processes the data received and applies the processed data along with control signals to printer engine 32 via line 33.

Printer engine 32 includes a print head 35 and a motion control mechanism 34 for causing and controlling the movement of paper to be printed and print head 35. Print head 35 includes a number of color printing elements (not shown), each for printing one color element. Print head 35 is an ink jet type of print head.

In one embodiment, print head 35 includes four color printing elements, one for black color, one for yellow color, one for cyan color, and one for magenta color. Each of the color printing elements can print an array consisting of a specific number of print dots. In a further embodiment, each of the four color printing elements includes an array of 64 nozzles. For this embodiment, print head 35 will print up to 64 print dots in an array. In alternative embodiments, each of the four color printing elements includes more or fewer than 64 nozzles.

Because printer 30 is a scan printer, print head 35 prints a complete print scan in two separate print passes or scans in accordance with the present embodiment of the present invention. Each print scan is comprised of a number of print arrays adjacent to each other.

As described above, each print array of a print scan line comprises a plurality of print dots or pixels printed by the color printing elements of print head 35. The maximum height of each print array corresponds to the height of print head 35 (i.e., that of each of the four color printing elements).

The four color printing elements of print head 35 are separated horizontally from each other by a predetermined distance. Therefore, the four color printing elements can be regarded as four separate print heads arranged together to print different colors. Because the color printing elements of print head 35 are arranged horizontally, the print from a subsequent color printing element of print head 35 can overlap the print of the preceding color printing element. By doing this, colors other than yellow, black, cyan, and magenta can be obtained and color printing can be accomplished. In other words, each of the print dots of each print array can be printed with more than one color in one print pass of print head 35.

Print head 35 is controlled by motion control mechanism 34 to move or scan. Print head 35 is controlled by printer controller 31 to print. Data to be printed in a scan printout is first loaded from the external host computer to printer controller 31. When the data to be printed is a multi-color data, the data is transferred to printer controller 31 in separate color bands of cyan, magenta, yellow, and black. The data is then stored in printer controller 31. Once adequate data is accumulated in printer controller 31 to complete a print scan of print head 35, printer controller 31 then processes the data in a manner which will be described in detail below and sends the data to print head 35 and causes print head 35 and motion control mechanism 34 to initiate the printing function. Motion control mechanism 34 controls (1) the advance of the paper on which print head 35 prints and (2) the scan movement of print head 35.

During operation, both (1) the movement of print head 35 and (2) the advance of the paper are controlled by motion control mechanism 34 in an asynchronous manner. The control of motion control mechanism 34 can be described as follows. First, the paper is caused by motion control mechanism 34 to advance. The distance of the paper advance is determined by motion control mechanism 34 which receives its control data from printer controller 31. Print head 35 is then controlled to make one scan printing across one scan line of the paper. After each scan printing by print head 35, motion control mechanism 34 controls the paper to advance for another predetermined distance.

As will be described in more detail below, printer controller 31 embodies one embodiment of the present invention. When the data to be printed is the multi-color data, printer controller 31 will process the data through a checkerboard filter (shown in FIG. 3) such that adjacent color print dots can be alternately printed so as to minimize color bleeding during the printing. As will also be described below, when the data to be printed includes color print data and black text data, printer controller 31 will process the data in such a way that the color print data passes through the checkerboard filter while the black text data bypasses the checkerboard filter and is directly applied to the black printing element of print head 35. In this way, color bleeding associated with the color printing can be minimized while the black text can be double printed in merely two print passes of print head 35 such that the throughput of printer 30 is increased and the print quality of both color printing and black text printing is optimized. Printer controller 31 in connection with one embodiment of the present invention will be described in more detail below, in conjunction with FIGS. 3–6.

Figure 3:
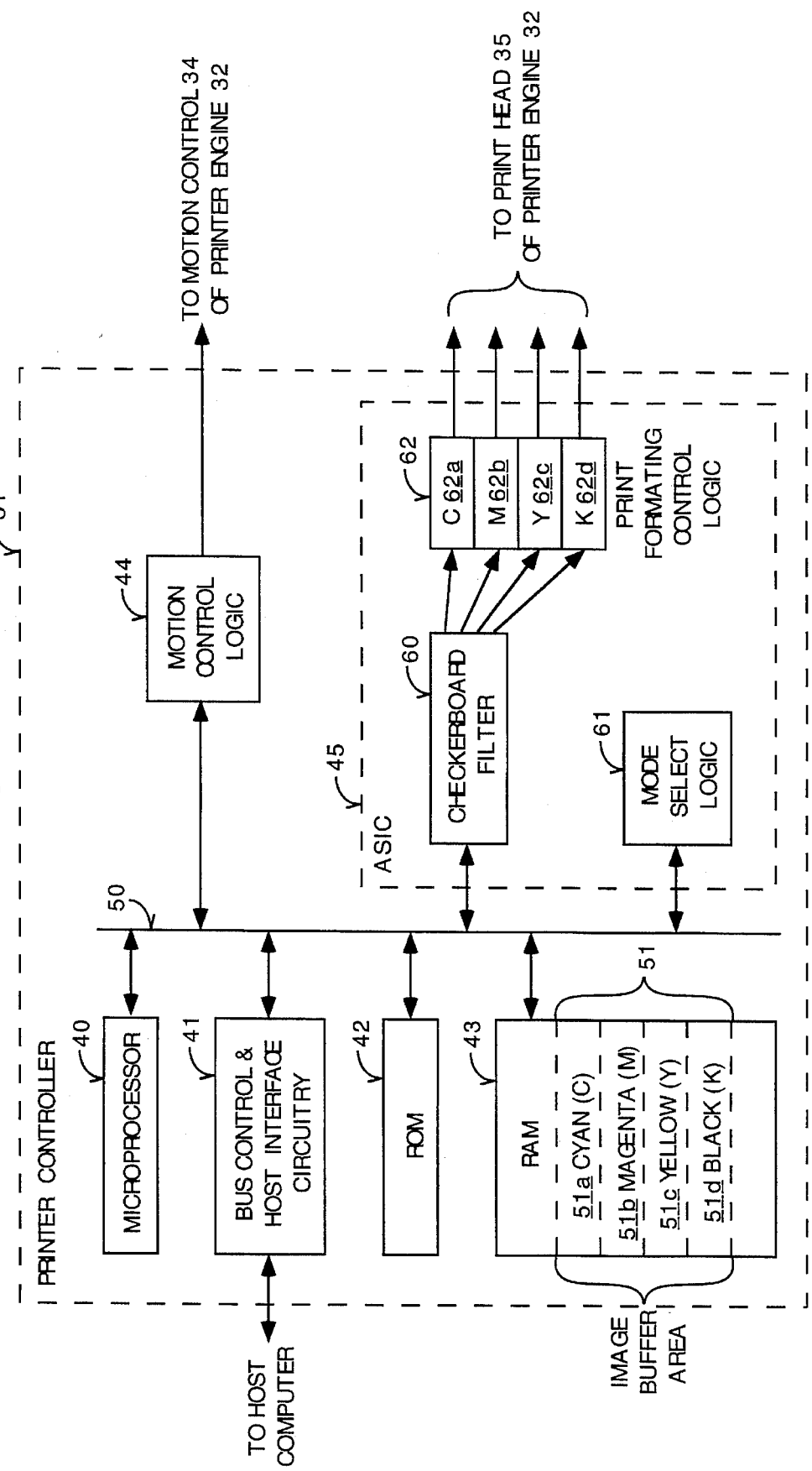
FIG. 3 is a block diagram of the printer controller of FIG. 2.

FIG. 3 illustrates in block diagram form the circuitry of printer controller 31. As described above, printer controller 31 processes the data to be printed and sends the processed data to print head 35 (FIG. 2) for printing. Printer controller 31 also generates the motion control data to motion control mechanism 34 (FIG. 2) of printer engine 32 for controlling the movement of print head 35 and the advance of the paper 37 for printing.

Printer controller 31 includes a microprocessor 40 coupled to a bus 50. Microprocessor 40 is the control unit of printer controller 31 that controls the operation of other units of printer controller 31. Bus 50 is used to transfer data and control signals among various units of printer controller 31.

Printer controller 31 further includes a bus control and host interface circuitry 41 coupled to the external host computer and bus 50. The function of bus control and host interface circuitry 41 is to interface printer controller 31 with the external host computer. Bus control and host interface circuitry 41 receives the print data from the external host computer and then transfers the print data to the appropriate unit of printer controller 31 via bus 50.

Printer controller 31 further includes a read-only memory ("ROM") 42, a random access memory ("RAM") 43, a motion control logic 44, and a print formatting control application specific integrated circuit ("ASIC") 45. These devices 42–45 also are connected to bus 50 for transmitting data among each other and to and from microprocessor 40 and bus control host interface circuitry 41. ROM 42 is used in printer controller 31 to store operational programs for microprocessor 40. RAM 43 is used to store the print data and control data for motion control logic 44. RAM 43 also stores other data for the operation of microprocessor 40.

RAM 43 includes an image buffer area 51. Image buffer area 51 stores the print data received from the external host computer. During operation, the imaging of the print data takes place in the external host computer and the external host computer then transfers the imaged print data to image buffer area 51 of RAM 43 via bus control and host interface circuitry 41.

In another embodiment, the imaging of the print data is done in an imaging controller external to the host computer and printer controller 31. In a further embodiment, the imaging controller is within printer controller 31.

Image buffer area 51 includes four sections, a cyan ("C") section 51a, a magenta ("M") section 51b, a yellow ("Y") section 51c, and a black ("K") section 51d. Each of sections 51a–51d stores its respective color print data of one print scan. For example, C section 51a stores the cyan color print data of the print scan and K section 51d stores the black color print data of the print scan. The color print data is stored in image buffer area 51 in a bit map format. When a print dot of a print scan on the paper requires a cyan color and a yellow color, the cyan data stored in C section 51a corresponding to the printing nozzle of the cyan color printing element of print head 35 for printing that particular print dot will cause that printing nozzle to apply the cyan color to the spot of the particular dot on the paper. In the same manner, the yellow data stored in Y section 51c corresponding to the printing nozzle of the yellow color printing element of print head 35 for printing the same particular print dot also causes that nozzle to apply the yellow color at the same spot on the paper.

In another embodiment, each print scan line is comprised of an upper half and a lower half. In this case, the paper is caused to advance only half of the height of the print scan line after each print pass such that the upper half of the subsequent print pass overlaps the lower half of the previous print pass, thus achieving the checkerboard printing and double black printing. In this situation, each of sections 51a–52d does not store a complete print scan and the paper is caused to advance after each print pass.

In one embodiment, when a particular print dot is required to be printed with three or more different colors, that particular dot will be printed with the black color only. This filtering operation may be performed by the external host computer or by the printer controller hardware or software. This operation is performed to limit the amount of ink on a dot that is essentially black anyway.

Each section of sections 51a–51d stores the respective color print data of all the respective color print dots along the entire print scan. For example, M section 51d stores the magenta color print data of all the magenta color print dots along the entire print scan. The print format of a print scan is schematically shown in FIGS. 5A and 5B.

FIGS. 5A and 5B schematically illustrate a print scan 150 which is comprised of a number of print dots. In FIGS. 5A and 5B, print scan 150 is shown only for illustration purposes to include six print arrays 151–156, each having four print dots. In practice, print scan 150 is comprised of many more print arrays and each of the print arrays includes many more color print dots. As shown in FIGS. 5A and 5B, print dot 151*a*, for example, is printed with a COLOR1. COLOR1, for example, is the mixture of cyan and magenta. In this case, the cyan data stored in C section 51*a* corresponding to the nozzle of the cyan printing element for printing print dot 151*a* will indicate a print for that nozzle and the magenta data stored in M section 51*b* corresponding to the nozzle of the magenta printing element for printing print dots 151*a* will also indicate a print for that nozzle. The two prints overlap each other such that the two color inks can be mixed together. Thus, color printing is achieved.

Referring back to FIG. 3, motion control logic 44 is used to receive motion control data from microprocessor 40 and RAM 43 and to generate appropriate control signals to control movement of printer engine 32. As is known, the movement of printer engine 32 includes the movement of print head 35 and the paper advance movement.

ASIC 45 is the print formatting control of printer controller 31. ASIC 45 retrieves the print data from image buffer area 51 of RAM 43 and formats the print data to control print head 35 to print. ASIC 45 includes a checkerboard filter 60, a mode select logic 61, and a print formatting control logic 62. Both checkerboard filter 60 and mode select logic 61 are connected to bus 50. Print formatting control logic 62 is connected to checkerboard filter 60. The outputs of print formatting control logic 62 are applied to print head 35 of printer engine 32.

Checkerboard filter 60 performs a checkerboard filtering function to the print data of a print scan stored in image buffer area 51 before the print data is applied to print formatting control logic 62. The checkerboard filtering operation of checkerboard filter 60 is controlled by mode select logic 61. When the print data from image buffer area 51 of RAM 43 is applied to checkerboard filter 60, the print data for the alternate print dots of the print scan are filtered out and will not be applied to print formatting control logic 62 under the control of mode select logic 61. Therefore, only 50% of the print data passes through filter 60. The processed print data is then printed out in a print pass of print head 35 via print formatting control logic 62. Subsequently, during the next print pass, the print data is applied again to checkerboard filter 60 to filter out the previously printed dots. The printing of this resulting processed data completes the print scan.

Mode select logic 61 controls checkerboard filter 60 (1) to filter out the alternate color print data of the cyan, magenta, and yellow colors, and (2) to allow the print data of the black color to bypass the filter such that 100% of the black color print data can be printed while only 50% of the cyan, magenta, and yellow color print data can be printed during each print pass.

Mode select logic 61 can change its mode select function. For example, mode select logic 61 can first cause checkerboard filter 60 to filter out the alternate odd color print data. Then, mode select logic 61 can be caused to change its mode select function such that the alternate even color print data can be filtered out by checkerboard filter 60.

Print formatting control logic 62 receives the processed print data from checkerboard filter 60. Print formatting control logic 62 also includes four control logics, C logic 62*a* for controlling the cyan printing element of print head 35, M logic 62*b* for controlling the magenta printing element of print head 35, Y logic 62*c* for controlling the yellow printing element of print head 35, and K logic 62*d* for controlling the black printing element of print head 35. Each of logics 62*a*–62*d* receives the corresponding processed color print data. For example, C logic 62*a* receives the processed cyan print data and K logic 62*d* receives the processed black print data.

According to one embodiment of the present invention, checkerboard filter 60 is controlled to only filter out the print data of the alternate cyan, magenta, and yellow color print dots of a print scan. Checkerboard filter 60, however, does not filter out the print data of the alternate black color print dots of the print scan. Instead, the black color print data bypasses filter 60 and is directly applied to K logic 62*d* of print formatting control logic 62 during each print pass. In this way, adjacent color print dots of a print scan can be alternately printed in two print passes of print head 35 to minimize color bleeding while the black dots of the print scan can be double printed during the same two print passes such that optical density on the black print dots can be achieved. By doing so, (1) color bleeding between color print dots is minimized; (2) optical density of the black print dots is achieved; and (3) the throughput of printer 30 in printing the combined color dots and black text dots is increased. The operation of ASIC 45 with respect to printing combined color print dots and black text dots is described below, in conjunction with FIGS. 4–6.

Figure 4:
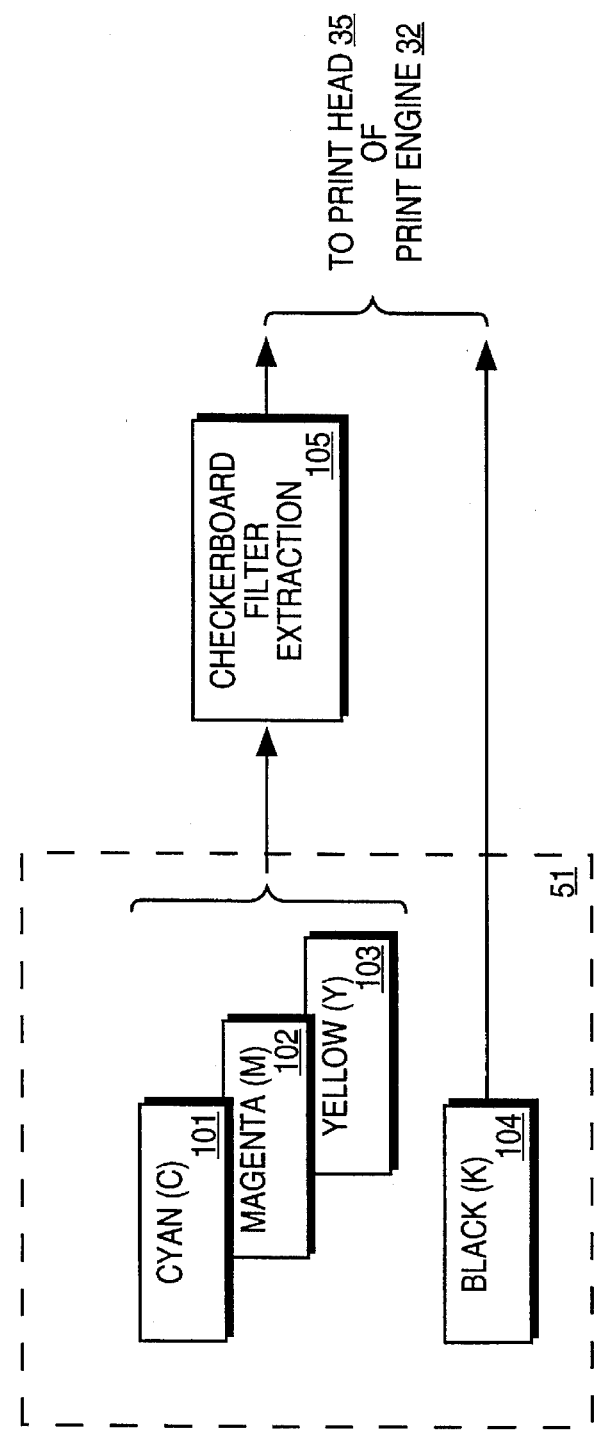
FIG. 4 is a block diagram illustrating the processing flow of the color print data in the printer controller of FIG. 3.

FIG. 4 illustrates in schematic form the processing flow of the color print data in printer controller 31 (FIG. 3), according to one embodiment of the present invention. As can be seen from FIG. 4, the cyan color print data 101, the magenta color print data 102, and the yellow color print data 103 stored in image buffer area 51 are all applied for a checkerboard pattern extraction 105 before being applied to print head 35. The black color print data 104 stored in image buffer area 51, however, bypasses checkerboard pattern extraction 105 and is directly applied to print head 35. In this way, the color print dots of a print scan that are associated with the cyan, magenta, and yellow colors are alternately printed in two print passes of print head 35 while each of the color print dots of the print scan associated only with the black color can be double printed in the two print passes. The results of each of the two print passes in accordance with the embodiment of the present invention shown in FIG. 4 are illustrated in FIGS. 5A and 5B, which will be described in more detail below.

FIG. 5A shows the result after the first print pass 150. As can be seen from FIG. 5A, every other adjacent color print dots for print arrays 151–154 are printed. Dots 151*a*, 151*c*, 152*b*, and 152*d* are printed with COLOR1 and dots 153*a*, 153*c*, 154*b*, and 154*d* are printed with COLOR2. COLOR1 and COLOR2 can be any one of the cyan, magenta, and yellow colors. COLOR1 and COLOR2 can also be the mixture of any two of the cyan, magenta, and yellow colors.

Because arrays 155 and 156 only contain black print dots, all the print dots of arrays 155–156 are printed with the black color during the first print pass. This is due to the fact that the black color print data does not undergo the checkerboard pattern extraction. The reason for not causing the black color print data to pass through the checkerboard pattern extraction is that the color bleeding is not a problem for the adjacent black color print dots.

After the first print pass is complete, the same print data stored in image buffer area 51 is applied to the checkerboard pattern extraction 105 again. However, at this time, the mode of the checkerboard pattern extraction is changed such that the data that has been filtered out previously can pass though the extraction while the data that previously passed through the checkerboard pattern extraction is filtered out. Again, the same black print data bypasses the checkerboard filtering. The result of the second print pass is then shown in FIG. 5B.

As can be seen from FIG. 5B, print dots in arrays 155–156 are double printed with the black color while print dots in each of arrays 151–154 are alternately printed.

Referring back to FIG. 3, the operation with respect to checkerboard filtering the cyan, magenta, yellow color print data during each of two print passes while bypassing the black color print data during each of the two print passes in ASIC 45 is described. During operation, the color print data for a print scan originates at the external host computer. The external host computer finishes imaging the color print data before the data is sent to printer controller 31. When the color print data for one print scan is received in bus control and host interface circuitry 41, the data is stored in separate color sections 51a–51d of image buffer area 51 of RAM 43.

Once the color print data is accumulated in image buffer area 51 to complete the entire print scan, the color print data can then be retrieved from image buffer area 51 for the checkerboard filtering in ASIC 45. This is accomplished by first setting up a direct memory access ("DMA") pointer for each color section of image buffer area 51. Since each of the four color printing elements of print head 35 (FIG. 2) is separated horizontally from each other by a predetermined distance, the DMA pointer for each color section can have a different offset.

The DMA pointer for each color section then directs the color print data to be retrieved to checkerboard filter 60 of ASIC 45. Under the control of mode select logic 61, checkerboard filter 60 strips out the appropriate alternate color print data bits to produce the resulting 50% checkerboard pattern printing on the printed paper. The control mode of mode select logic 61 is set by microprocessor 40 before each print pass of print head 35 (FIG. 2). The control mode of mode select logic 61 for the second print pass of print head 35 is complementary to that of the first print pass. For example, if the control mode of mode select logic 61 is first set to cause checkerboard filter 60 to strip out the appropriate odd color print data (except the black color print data), then the control mode of mode select logic 61 will then be set to cause checkerboard filter 60 to strip out the appropriate even color print data (except the black color print data).

Mode select logic 61 also causes the black color print data not to be filtered by checkerboard filter 60 such that 100% of the black color print data can be printed by the black color printing element of print head 35 during each print pass of print head 35. The processed print data is then fed to the respective logic of print formatting control logic 62.

Microprocessor 40 changes the control mode of mode select logic 61. Mode select logic 61 then controls checkerboard filter 60 to retrieve the same color print data for a repeated filtering operation. At this time, mode select logic 61 causes checkerboard filter 60 to filter out the color print data that was printed out during the previous print pass. Again, the black color print data is allowed to pass without checkerboard filtering such that the same block color print dots are double printed with the black color. The complete process of checkerboard filtering the color print data and double printing the black color print data is described below, in conjunction with FIG. 6.

Figure 6:
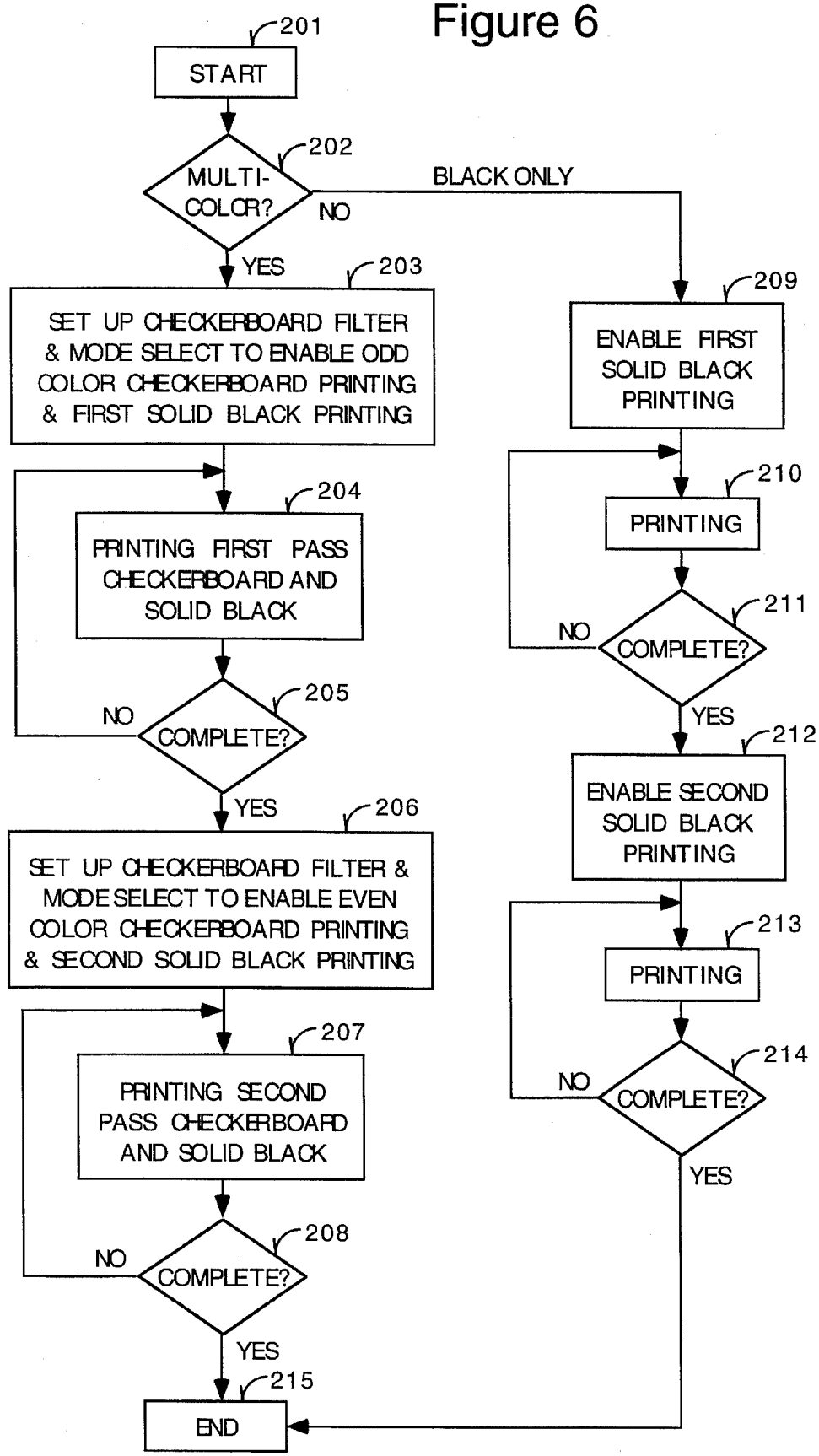
FIG. 6 is a flow chart diagram illustrating the operation of the printer controller in accordance with one embodiment of the present invention.

FIG. 6 illustrates in a flow chart diagram form the method of printing the combined color print and black text print in two print passes in accordance with one embodiment of the present invention. As shown in FIG. 6, the process starts at step 201. At step 202, a determination is made to determine if the print data is a multi-color print data or is a black only print data. If the print data is the black only print data, then steps 209 through 214 are performed in which a first solid black printing and a second solid black printing are performed, respectively, at steps 209 and 212. The process then ends at step 215.

If, at step 202, it is determined that the print data is the multi-color print data, then step 203 is executed at which checkerboard filtering and mode select are both set up to enable odd color checkerboard pattern printing and a first solid black printing for the black print data. The processed data is then printed at step 204 in the odd checkerboard pattern and solid black pattern. At step 205, a determination is made to learn if the printing is complete. If not, the process then returns to step 204. If so, step 206 is performed to set up the checkerboard filtering and mode select for the even color checkerboard pattern printing and a second solid black printing for the same black print data. At step 207, the actual printing takes place. At step 208, another determination is made to decide whether the printing is complete. If not, the process returns to step 207. If so, the process ends at step 215.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for optimizing printing a first print dot, a second print dot, a third print dot, and a fourth print dot adjacent to each other on a sheet of paper by a printer including a print head which prints dots with a black color and a plurality of non-black colors, a printer controller controlling the print head to print, and a motion control mechanism causing and controlling movement of the paper and the print head, the print head printing in passes across the paper, the method comprising the steps of:

(A) determining whether each of the first print dot, the second print dot, the third print dot, and the fourth print dot to be printed is in the black color, wherein any one of the first print dot, the second print dot, the third print dot, and the fourth print dot to be printed in the black color needs to be double printed with the black color;

(B) if each of the first print dot and the second print dot is in the black color and each of the third print dot and the fourth print dot is in a non-black color, then optimizing the printing of the first print dot, the second print dot, the third print dot, and the fourth print dot by (i) printing the first print dot and the second print dot with the black color and the third print dot with the non-black color during a first print pass by the print head;

(ii) double printing the first print dot, the second print dot with the black color and printing the fourth print dot with the non-black color during a second print pass by the print head such that the first print dot and the second print dot are double printed with the black color and the third print dot and the fourth print dot are alternately printed during the first print pass and the second print pass, wherein color bleeding is minimized between the third print dot and the fourth print dot while the first print dot and the second print dot are double printed with the black color by only the first print pass and second print pass to increase print density with a resulting increase in throughput of the printing.

2. The method of claim 1, further comprising the step of (C) if each of the first print dot, the second print dot, and the third print dot is in the non-black color while the fourth print dot is in the black color, then
 (i) printing the first print dot and the third print dot with the non-black color and the fourth print dot with the black color during the first print pass by the print head, wherein the second print dot is located between the first print dot and the third print dot;
 (ii) printing the second print dot with the non-black color and double printing the fourth print dot with the black color during the second print pass by the print head.

3. The method of claim 1, further comprising the step of (D) if each of the first print dot, the second print dot, the third print dot, and the fourth print dot is in the non-black color, then
 (i) printing the first print dot and the third print dot with the non-black color during the first print pass by the print head;
 (ii) printing the second print dot and the fourth print dot with the non-black color during the second print pass by the print head.

4. The method of claim 1, further comprising the step of (E) if each of the first print dot, the second print dot, the third print dot, and the fourth print dot is in the black color, then
 (i) printing the first print dot, the second print dot, the third print dot, and the fourth print dot with the back color during the first print pass by the print head;
 (ii) double printing the first print dot, the second print dot, the third print dot, and the fourth print dot with the back color during the second print pass by the print head.

5. The method of claim 1, further comprising the step of (F) if each of the first print dot, the second print dot, and the third print dot is in the black color while the fourth print dot is in the non-black color, then
 (i) printing the first print dot, the second print dot and the third print dot with the black color, and the fourth print dot with the non-black color during the first print pass by the print head;
 (ii) double printing the first print dot, the second print dot, and the third print dot during the second print pass by the printer.

6. The method of claim 1, wherein the step (B) further comprises the step of sending data of the third print dot and the fourth print dot through a checkerboard filter to the print head while directly applying data of the first print dot and the second print dot to the print head, bypassing the checkerboard filter, such that the third print dot and the fourth print dot are printed alternately during the first print pass and the second print pass.

7. A method for optimizing ink jet printing a plurality of print dots adjacent to each other on a sheet of paper by a printer including a printing means for printing dots with a black color and a plurality of non-black colors, a printer controller controlling the printing means to print, and a motion control mechanism causing and controlling movement of the paper and the printing means, the printing means printing in passes across the paper, wherein the plurality of print dots include a number of non-black color print dots and a number of black text dots, wherein the method comprises the steps of:

(A) separating data of the number of black text dots from data of the number of non-black color print dots, wherein the number of black text dots need to be double printed;

(B) optimizing the ink jet printing by
 (a) sending the data of the number of non-black color print dots to a checkerboard filter to obtain data of a first alternate number of non-black color print dots and a second alternate number of non-black color print dots from the data of the number of non-black color print dots, wherein the first alternate number of non-black color print dots and the second alternate number of non-black color print dots constitute the number of non-black color print dots, wherein each of the first alternate number of non-black color print dots is adjacent to one of the second alternate number of non-black color print dots;
 (b) directly applying the data of the number of black text dots to the printing means, bypassing the checkerboard filter, such that the number of black text dots are all printed in each of a first print pass and a second print pass of the printing means;
 (c) printing the first alternate number of non-black color print dots and the number of black text dots in the first print pass of the printing means;
 (d) printing the second alternate number of non-black color print dots and double printing the number of black text dots in the second print pass of the printer such that the number of non-black color print dots are alternately printed while the number of black text dots are double printed during the first print pass and the second print pass so as to minimize color bleeding between the number of non-black color print dots while the number of black text dots are double printed during only the first print pass and the second print pass such that print density of the number of black text dots is increased with a resulting increase in throughput of the ink jet printing.

8. The method of claim 7, wherein the printer is a color ink jet printer, and the printing means is a print head that includes a black print element and a number of non-black color print elements.

9. The method of claim 7, wherein the first alternate number of non-black color print dots are odd non-black color print dots and the second alternate number of non-black color print dots are even non-black color print dots.

* * * * *